United States Patent [19]

Klahn et al.

[11] 4,014,156
[45] Mar. 29, 1977

[54] METHOD OF PRODUCING INDIVIDUALLY WRAPPED CONFECTIONS AND APPARATUS FOR PERFORMING THE SAME

[75] Inventors: Uwe Klahn; Klaus Oberwelland, both of Halle, Westfalen, Germany

[73] Assignee: August Storck KG, Halle, Westfalen, Germany

[22] Filed: Feb. 24, 1975

[21] Appl. No.: 552,063

[30] Foreign Application Priority Data

Mar. 8, 1974   Germany ..................... 2411093

[52] U.S. Cl. ..................... 53/34; 53/227; 53/370; 426/282; 426/414
[51] Int. Cl.² ..................... B65B 11/34
[58] Field of Search ............. 53/34, 227, 221, 222, 53/234, 166, 370; 426/279, 280, 282, 414, 811

[56] References Cited

UNITED STATES PATENTS

| 472,202 | 4/1892 | Tripp | 53/370 X |
|---|---|---|---|
| 980,329 | 1/1911 | Northup | 53/227 X |
| 1,131,881 | 3/1915 | Wilbur | 53/227 X |
| 1,131,881 | 3/1915 | Wilbur | 53/227 |
| 1,417,446 | 5/1922 | Brigham | 426/282 X |
| 1,984,894 | 12/1934 | Rose | 53/370 |
| 2,082,313 | 6/1937 | Todd | 426/512 X |
| 2,166,568 | 7/1939 | Kuhlke | 426/416 |
| 2,267,494 | 12/1941 | Dotzer | 426/282 |
| 2,471,867 | 5/1949 | Fisher et al. | 426/414 |
| 2,608,039 | 8/1952 | Abramowski | 53/234 |
| 3,047,990 | 8/1962 | Du Broff | 53/166 |
| 3,260,030 | 7/1966 | Wach | 53/34 X |
| 3,323,273 | 6/1967 | Lee | 53/34 X |
| 3,517,831 | 6/1970 | Hahn | 53/166 X |
| 3,528,212 | 9/1970 | Jones | 53/34 |
| 3,666,388 | 5/1972 | Oberwelland | 426/279 |
| 3,897,567 | 7/1975 | Inklaar | 426/811 X |

FOREIGN PATENTS OR APPLICATIONS 728,903   4/1953   United Kingdom ............... 426/414

*Primary Examiner*—Travis S. McGehee
*Assistant Examiner*—John Sipos
*Attorney, Agent, or Firm*—Browdy and Neimark

[57] ABSTRACT

Method and apparatus for producing individually wrapped confections in centrifugal molds by inserting a wrapper material into the mold, introducing a portion of flowable confectionery mass into the upwardly open wrapper and then rotating the mold to distribute the confection over the bottom and sides of the wrapper, setting the mass, filling the hollow case of confection thus formed and then sealing the projecting edges of wrapper material and removing from the mold.

2 Claims, 12 Drawing Figures

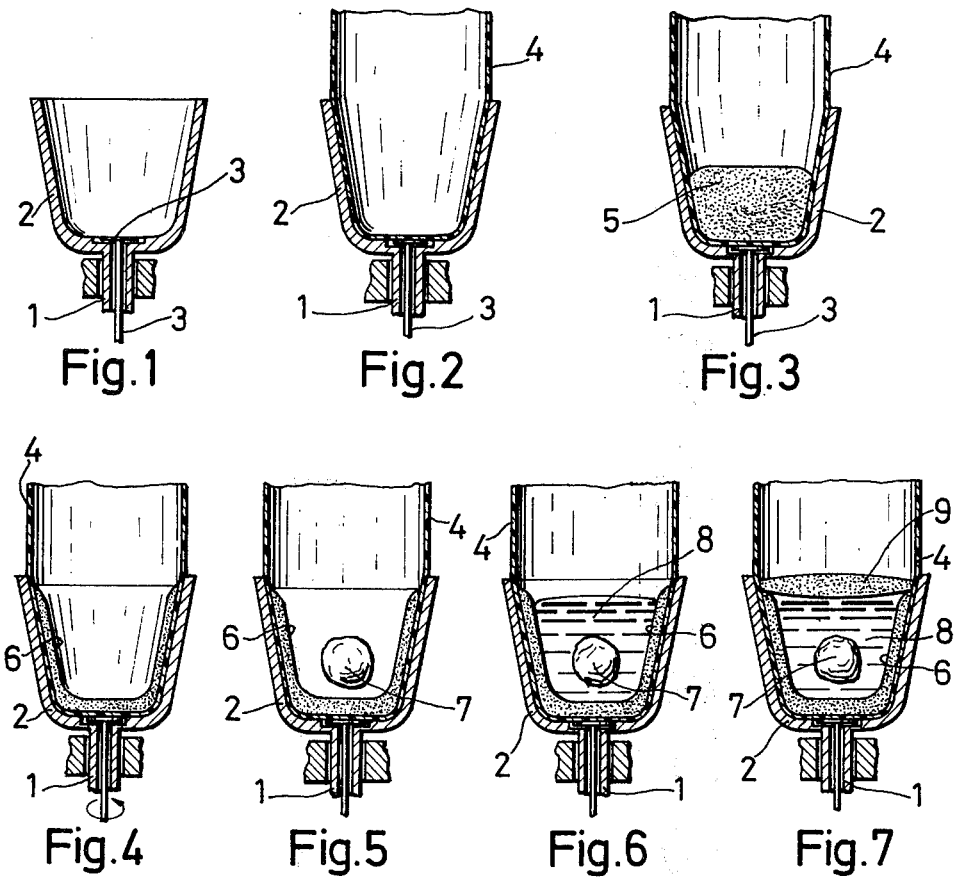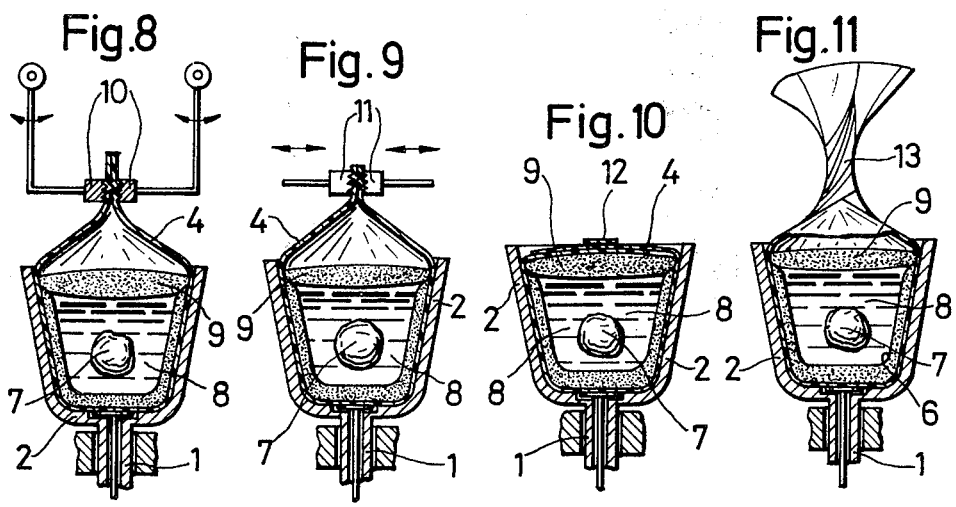

METHOD OF PRODUCING INDIVIDUALLY WRAPPED CONFECTIONS AND APPARATUS FOR PERFORMING THE SAME

The invention relates to a method of producing individually wrapped confections in an open top hollow mold having a mold cavity which determines the shape of the molded confections. The invention also concerns apparatus for performing the method. It is the usual practice to produce confections, whether these are hard boiled sweets or chocolate confections with or without centers, in some kind of a casting or pressing mold the confectionery making machine delivering them from the molds before they are provided with one or more wraps in a specially designed packaging or wrapping machine. This is a complicated process which takes time to perform and requires the cooperation of different types of machinery.

BACKGROUND OF THE INVENTION

Confectionery masses which are at first sticky, such as hot caramel, sugar or like masses, cannot be processed in this way at all, because they are difficult to get out of the molds, particularly when these are casting molds. Special difficulties are encountered in the production of hollow or filled confectionery, such as brandy-cherries and so forth. In German Patent Specification No. 1,955,056 and in the corresponding British Patent Specification No. 1,290,359 apparatus for the production of hollow confections has already been proposed comprising open top molds which are supplied from above with a flowable confectionery mass, temporarily rotated about a vertical axis and then cooled and discharged. Although in practice this apparatus has been a success, it does not entirely overcome the above mentioned shortcomings of conventional machines and it can process only such confectionery masses as will not stick to the molds.

The present invention eliminates these remaining defects, the object being to provide a method, and apparatus for performing the method, which will permit finished ready-wrapped confections to be economically produced without trouble irrespective of the nature of the processed confectionery masses.

SUMMARY OF THE INVENTION

According to the invention this is achieved by introducing into the stationary mold a wrapper material for lining the internal cavity of the mold, by filling a portion of the flowable confectionery mass into the upwardly open wrapper and then distributing the same over the bottom and sides of the wrapper by rotating the mold at a suitable speed which depends upon the composition and consistency of the mass and which is continued until the mass has set, by providing the hollow case thus formed in conventional means by spinning with a filling, and by closing the edges of the wrapper material projecting from the mold over the finished confection when this has set before finally removing the wrapped confection from the mold. Preferably rotation of the charged mold is not started until the surface of the mass is level. The wrapper material can be retained inside the mold by vacuum pressure, by roughening or profiling of the internal mold wall or in some other way, or a wrapper blank may be forced into the hollow mold so that it applies itself to the internal mold wall, by compressed air, vacuum pressure or by a plunger, or the wrapper may be a preshaped bag which conforms with the internal shape of the mold.

Moreover, in order to ensure that the confection can be later readily removed from its wrapper the wrapper material may be coated with a parting or like agent before it makes contact with the confectionery mass. Such an agent may also be applied to the mold itself to facilitate the removal of the wrapped confection. After having been provided with confectionery mass the molds are cooled and the wrapper is closed by folding or twisting together its projecting edges or by hot sealing, gluing or impressed seaming the edges before the wrapper containing the confection is taken out of the mold.

Apparatus for performing this method comprises cup-shaped molds that are rotatable about vertical axes by their temporary connection to rotary drive means and that are traversed below metering feed means for the flowable confectionery mass, which feed means are preceded by means for the insertion of a wrapper blank or of a preformed wrapper into each of the centrifugal molds as these travel to the metering feed means, whereas prior to the removal of the confections from the molds closing means are provided for closing, over the tops of the confections, the wrapper material projecting from the molds.

The feeder supplying the wrapper material may be designed in various possible ways. It may withdraw wrapper material from a continuous roll, or wrapper blanks of suitable size from a pile, and insert the same into the centrifugal molds by a punch unless the blanks are preshaped wrappers which need merely be pushed into the cavity of the centrifugal mold. Similarly a wide diversity of folding and closing devices can be used for closing the wrappers. A particularly useful arrangement avails itself of the rotatable mounting of the centrifugal molds for twisting the wrapper ends together, suitably designed jaws or pressing tools merely pressing the projecting ends of the wrapper material together and keeping them in fixed position while a few turns are given the mold by special drive means to create the required twist. The jaws can then be used to lift the wrapped confections out of their molds and to remove them.

The invention can be performed in diverse different ways, some of which are illustratively shown in the accompanying drawings

BRIEF DESCRIPTION OF THE DRAWINGS

FIGS. 1 to 11 are diagrammatic representations of centrifugal casting molds and the method according to the invention will be described by reference thereto.

DESCRIPTION OF PREFERRED EMBODIMENTS

Figure 12:
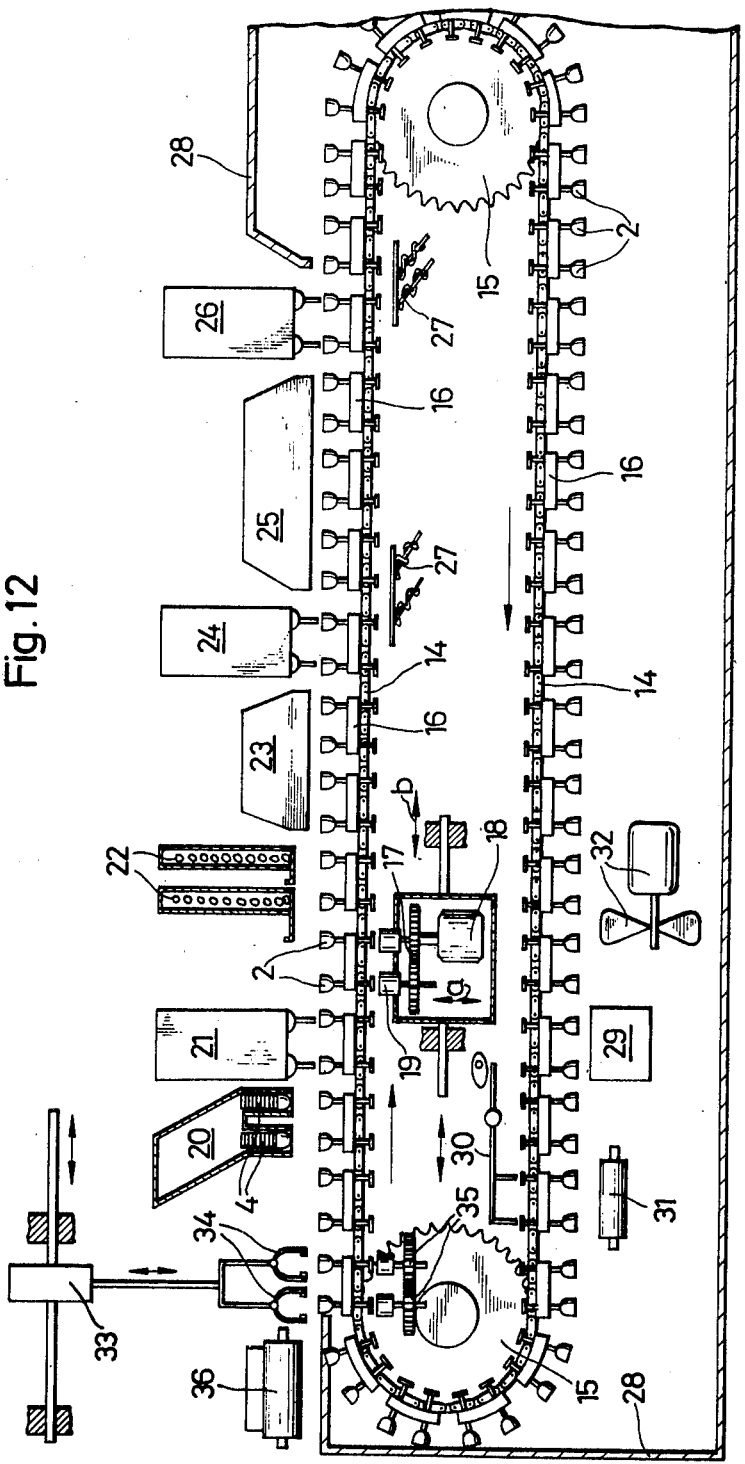
FIG. 12 is a diagrammatic representation of a machine for performing the method.

The confectionery machine to which FIGS. 1 to 11 relate is equipped with open-top, cup-shaped molds 2 rotatable about a vertical shaft 1 which in an axial bore contains an axially movable ejector 3 for ejecting the finished confections. First a preformed wrapper 4 is inserted from above into the empty mold 2 in FIG. 1. Alternatively a feeder may be arranged to deposit a flat blank of wrapper material on the open top of the mold 2 followed by the descent of a suitable plunger which applies the blank to the inside wall of the mold so that the wrapper material forms a lining. The size of the wrapper or blank is appropriately calculated to ensure that a portion of the wrapper material will project from the open top of the mold.

When the wrapper material 4 has been inserted into the mold 2 a flowable confectionery mass 5 is poured in. Rapid rotation is then imparted to the mold, but preferably not until the surface of the confectionery mass is quite level. The molds 2 are rotated about their vertical shafts at least for a predetermined period of time, suitable drive and timing means being provided. The speed of rotation and the spinning time depend upon the composition and consistency of the confectionery mass that is to be molded.

Suitable precautions must be taken to ensure that the wrapper cannot detach itself from the mold. These may comprise suitably shaping the profile of the wrapper and/or internal mold surface or by locating the wrapper by compressed air from above or suction from below. The mold and the wrapper must jointly rotate to ensure that the centrifugal forces will cause the confectionery mass to rise up the inside wall of the mold and to form a hollow cup 6 which can be set. This can be done by a blast of cold air or by conveying the mold into a cooling zone. In another working station a nut, raisin, fruit or the like 7 may be introduced into the open mold 6 and finally the molded confectionery case can be filled with any desired filling material 8 of a liquid or cream-like consistency. The open top of the confection is then closed with a capping mass 9 for which purpose rotation of the mold may be resumed to ensure that the capping mass spreads evenly over the top of the confection and fuses with the upper edges of the initially formed case 6. When the capping material 9 has also set the wrapper can be closed. FIGS. 8 to 11 illustrate different possible ways of closing the wrapper. In FIG. 8 use is made of two cooperating hot sealing tools 10 which merely press together the edges of the wrapper material 4 and form a seam by hot sealing.

In the closing device shown in FIG. 9 a mechanical impressed seam is formed by pressing tools 11, whereas in FIG. 10 folding instruments 12 produce a folded closure for instance in the manner of a "punch packing". Finally FIG. 11 illustrates the method of closing the wrapper by twisting its edges to a neck 13. In the methods of closing the wrapper shown in FIGS. 8, 9 and 11 the portions of the wrapper material projecting from the top of the mold also provide means whereby the finished and wrapped confections can be lifted out of the mold.

FIG. 12 is a diagrammatic representation of a machine which permits wrapped confections to be produced in an extremely economical way. The machine contains conveyor chains 14 which run in parallel over driving and return wheels 15 in the arrowed direction either in intermittent steps or continuously. The chains are cross connected by carrier beams 16 on which the shafts and centrifugal molds 2, which are only schematically shown in the drawing, are rotatably mounted. In the working zones in which rotation is imparted to the molds drive means 17 and a motor 18 for a coupling head 19 controlled and operated by a time switch are provided. The drive means and coupling head can be raised and lowered as indicated by $a$ to impart the required rotation to the centrifugal molds for the required period of time. Instead of being fixed the entire drive may be arranged to travel to and fro in the direction indicated by arrow $b$ if the chain conveyor travels continuously or the spinning time is to be prolonged.

In order to permit the machine to work economically a large number of separate centrifugal molds 2 are mounted on the chain conveyor in longitudinal and transverse rows, one or several rows of molds being simultaneously driven and filled. Above the level of the travelling molds there is firstly a feeder for the supply of blanks of wrapping material or a device 20 adapted to insert preformed wrappers into the molds. Means, not shown in the drawing, are also provided for pressing the wrappers into the mold as well as instruments or devices for retaining the wrappers inside the molds.

The molds that have been provided with wrappers are then conveyed to a metering feed means 21 for the flowable confectionery mass that is to form the case of the confection or sweet, such as a hard boiled sugar, chocolate or like mass. Rotation of the molds can be begun during the process of pouring in the confectionery mass, but preferably rotation is delayed until the mass has formed a level surface in the mold, as indicated for instance in the diagrammatic drawing. A feeder 22 is then provided for the insertion of a solid, such as a nut, a raisin, a fruit or the like, into the open case. The molds then pass through a cooling zone 23 where the confectionery mass sets, behind which there follows a pouring device 24 which provides the cases with a filling of liqueur, fondant, jam, creme or the like which may be in the form of a soft paste or of a liquid. The molds are then conveyed through another cooling zone 25 and a cap casting device 26 which discharges a capping mass, i.e. a confectionery mass that will set, on the open top of the case. In order to ensure that this mass spreads evenly over the top spinning of the molds may be resumed for a short time. Finally at the several stations the molds may pass over vibrators 27. These may be necessary to ensure that the confectionery masses are dense and well distributed in the molds.

Preferably the entire machine is accommodated inside a housing 28 which is air-conditioned to ensure that the masses will set as quickly as possible. The returning portion of the chain conveyor carries the molds back to the starting point of the process. The confections first remain inside the molds. During their return journey the molds pass across folding instruments 29 which are only schematically indicated and which are designed in a suitable manner to fold the parts of the wrapper projecting from the open end of the molds. Finally the fully wrapped confections are dislodged by an ejector 30 and drop on a cross conveyor belt 31 which carries them to a collecting point. A cooling fan 32 ensures that the air inside the housing 28 is conditioned and circulated as is desirable.

The set of folding instruments 29 and the ejector 30 can be inactivated if the wrappers are to be closed by twisting. For such an eventuality a toolholder 33 is provided above the conveyor chain. At its bottom end the toolholder is fitted with two rows of gripper instruments 34 which open and close, and which can be vertically raised and lowered and moved horizontally to and fro as a unit. Below this arrangement and underneath the chain conveyor is a drive means 35 controlled by a time switch and adapted to be coupled to the mold shafts for rotating the moulds and thus forming the twisted necks. When the grippers 34 have gripped the projecting edges of the wrapper material projecting from the top of the molds the latter are given a few turns by activation of the drive means 35 so that the wrapper ends are twisted whilst the grippers 34 keep the wrapper ends fixed. The closed grippers 34 are then raised and traversed to one side, thus lifting the wrapped confections out of the molds and depositing them on a cross conveyor 36.

For the sake of simplicity means and instruments for retaining the wrapper inside the mold are not shown. Finally the several assemblies at the different working stations can be started, stopped and employed in a variety of ways. Means may also be provided for applying a parting agent to the wrapping material before the introduction of the confectionery mass to permit the confections to be easily taken out of their wrappers for consumption. All the working assemblies, such as the metering feeders, folding and closing instruments, drive means, transmissions, couplings as well as the time switches are of conventional type and call for no special description.

We claim:

1. In a method of continuously producing a series of confections by spinning flowable confectionery mass in a series of open top molds into which the mass has been introduced and to which rotation about a vertical axis is imparted by drive means for a limited period of time, the rotation being stopped when the mass has set in each mold and the confection then being removed from the mold, the improvement comprising:

providing said molds in series with a generally cup-shape with the mouth of each mold constituting the widest portion of said mold;

inserting through the mouth of each said mold a wrapper material which will not tightly adhere to the confection to line the interior of said mold and form a partly finished single casing for a confection to be cast therewithin, the ends of the wrapper freely extending vertically through the mouth and above the height of the mold;

retaining said wrapper within the mold by vacuum pressure and without supporting the wrapper above the mouth of the mold;

casting a flowable confectionery mass into the upwardly open wrapper and permitting the flowable mass to become level;

rotating the mold to distribute the flowable confectionery mass over the bottom and sides of the wrapper and to thereby form a cavity within said confectionery mass;

completing the confection comprising at least providing said cavity in said confectionery mass with a filling;

gripping the edges of said wrapper together from above the confectionery mass to close over said mass and holding the edges stationary while rotating the mold to complete the wrapping of the finished confection; and removing said confection from the mold.

2. In an apparatus for continuously producing a series of confections, comprising:

a plurality of open topped molds; means for introducing a measured quantity of castable confectionery material into said molds and located at a first station; means to rotate said open top molds to form a hollow body of said confectionery material generally corresponding to the internal shape of the mold, by centrifugal force acting on the castable confectionery material, said means including couplings which releasably engage said molds in series at a second station; endless chain means for conveying said molds in series past said first and second stations; holder means rotatably holding a mold and attached to said endless chain means; and means for controlling said couplings to provide rotation of a mold upon the introduction of said castable confectionery material into said mold; the improvement comprising:

said molds having a generally cup-shape with the mouth of each mold consituting the widest portion of said mold;

means for the insertion of wrappers into each of said open top molds such that the wrappers extend freely and unsupported vertically above the mouth and side walls of the molds, said means for the insertion of said wrappers being located at a station upstream of said first station so that said castable confectionery material is introduced into said molds within said wrappers;

means for retaining the wrappers inside said molds; and closing means for closing the edges of the wrapper material projecting from the mold over the top of each confection, said closing means being located at a station downstream from said second station, said closing means comprising supplementary drive means located under the endless chain means for rotating said molds, grippers located above said molds for gripping the wrapper material projecting freely and unsupported above the tops of the molds and retaining same during a brief period while rotation is imparted to the molds by said supplementary drive means, and means to raise and laterally move said grippers to lift the wrapped confections out of the molds.

* * * * *